United States Patent [19]

Tahon et al.

[11] Patent Number: 5,262,271
[45] Date of Patent: Nov. 16, 1993

[54] NEGATIVE SILVER SALT DIFFUSION TRANSFER MATERIAL

[75] Inventors: Jean-Pierre D. Tahon, Leuven; Wilhelmus Janssens, Aarschot, both of Belgium

[73] Assignee: AGFA-Gevaert, N.V., Mortsel, Belgium

[21] Appl. No.: 774,189

[22] Filed: Oct. 10, 1991

[30] Foreign Application Priority Data

Oct. 19, 1990 [EP] European Pat. Off. ............ 90,20279

[51] Int. Cl.$^5$ ........................... G03C 5/54; G03C 5/42
[52] U.S. Cl. ............................... 430/244; 430/230; 430/414; 430/415; 430/416; 430/404; 430/566; 430/568
[58] Field of Search ............... 430/230, 229, 234, 231, 430/414, 415, 416, 568, 617, 404, 566, 244

[56] References Cited

U.S. PATENT DOCUMENTS

| | | | |
|---|---|---|---|
| 3,672,904 | 6/1972 | de Mauriac | 430/617 |
| 4,229,908 | 11/1981 | Ito et al. | 430/234 |
| 4,247,617 | 1/1981 | Debruyn et al. | 430/228 |
| 4,693,955 | 9/1987 | Torizuka et al. | 430/230 |
| 4,725,534 | 2/1988 | Kagami et al. | 430/617 |
| 4,728,596 | 3/1988 | Takaki et al. | 430/230 |
| 4,772,535 | 9/1988 | Yamano et al. | 430/230 |

*Primary Examiner*—Richard L. Schilling
*Attorney, Agent, or Firm*—Breiner & Breiner

[57] ABSTRACT

According to the present invention a method for producing a negative image is provided, comprising the following steps:

image-wise exposing an imaging element comprising on a support, a light-sensitive silver halide emulsion layer comprising silver halide grains having an average volume of not more than 0.02 $\mu m^3$ and a layer containing non-light-sensitive water insoluble silver salt, to produce a latent image in said layer of light-sensitive silver halide developing said latent image to produce physical development nuclei of silver dissolving the non-light-sensitive silver salts using a silver salt complexing agent and allowing the thus formed silver salt complexes to diffuse to the layer containing said image-wise formed physical development nuclei of silver to image-wise deposit and develop said silver salt complexes on said image-wise formed physical development nuclei of silver in the presence of (a) developing agent(s).

6 Claims, No Drawings

NEGATIVE SILVER SALT DIFFUSION TRANSFER MATERIAL

DESCRIPTION

1. Field of the Invention

The present invention relates to a method for producing a negative image starting from a positive original using the silver salt diffusion transfer reversal process.

2. Background of the Invention

The principles of the silver complex diffusion transfer reversal process, hereinafter called DTR-process, have been described e.g. in U.S. Pat. No. 2,352,014 and the book "Photographic Silver Halide Diffusion Processes" by André Rott and Edith Weyde—The Focal Press—London and New York, (1972).

According to the DTR process, a silver complex salt is image-wise transferred by diffusion from the image-wise exposed silver halide emulsion layer into the image receiving layer, where it is converted to a silver image usually in the presence of physical development nuclei. For this purpose, the image-wise exposed silver halide emulsion layer is developed in the presence of a developing agent and non-developed silver halide is converted by means of a silver halide complexing agent into a soluble silver complex salt while in contact with an image receiving layer.

At the exposed areas of the silver halide emulsion layer the silver halide is developed (chemical development) and thus cannot be dissolved anymore to diffuse to the receiving layer.

At the unexposed areas of the silver halide emulsion layer the silver halide is converted to a soluble silver complex salt and is transferred to the receiving layer, where it forms a silver image usually in the presence of physical development nuclei.

The DTR process includes (a) a so-called "two-sheet" type where the silver halide emulsion layer and the image receiving layer are contained on separate supports and are brought in contact with each other at the time of diffusion transfer development to produce the silver image in the receiving sheet and (b) a so-called "monosheet" type where both the emulsion layer and the layer containing the physical development nuclei are contained on the same support.

It is well known that the above described DTR process can produce transfer images of high quality in the receiving layer. However the thus produced image is a positive image with respect to the original and todate a great need exists in the graphical art for materials producing negative images of high quality.

Several attempts have therefore been made to obtain a negative image of high quality from a positive original using the DTR-process.

One such attempt is the use of a direct positive type emulsion instead of the usual negative type emulsions. Such a method is described in e.g. Japanese Patent Laid-open application (Kokai) No. 96648/01, CA-P-1139767 and U.S. Pat. No. 4,309,499. This method has however the disadvantage that relative large amounts of silver are required and furthermore the speed of such a material is rather low.

Another method for obtaining a negative image from a positive original with the DTR process is described in the Japanse Patent Laid-open application (Kokai) No. 15247/59. The Japanese patent application describes a silver halide diffusion transfer material comprising on a support in the order given, a layer containing a light-sensitive silver halide, a layer containing non-light-sensitive metal salt particles and a layer containing physical development nuclei. Said layer containing the light-sensitive silver halide also contains a substance that releases a compound, which acts either as a solubiliser for the above mentioned non-photosensitive metal salt particles or as a solubilising physical developing promoter, upon reaction with the oxidized compound of a developing agent. After image-wise exposure and during the development said compound image-wise releases the solubiliser or solubilising physical developing promoter for the metal salt particles which then image-wise solubilises the metal salt particles and deposits them in the layer containing the development nuclei.

However such a method has the disadvantage that relative large amounts of the compound that releases the solubiliser or solubilising physical developing promoter have to be used to obtain an image of sufficient density. Furthermore, said compound is difficult to prepare thus increasing the cost of the imaging element.

A further method to obtain a negative image from a positive original by using the silver salt diffusion transfer process is described in NL-P-6606960. The application describes the use of an imaging element comprising on a support a layer containing image-wise dispersed development nuclei. These image-wise dispersed development nuclei may be produced by image-wise exposing a silver halide emulsion layer to produce a latent image therein. The imaging element is then developed in the presence of an acidic or neutral aqueous solution of silver salts. The water soluble silver salts may also be present in a layer which may be contained on the same support as the layer containing the image-wise dispersed development nuclei or on a separate support. This imaging element is then processed in the presence of water. A negative image is obtained in the layer containing the image-wise dispersed development nuclei.

This method has the disadvantage that if the layer containing the image-wise dispersed development nuclei and the layer containing the water soluble silver salt are contained on the same support, one of both layers needs to be rinsed at 50° C. which is inconvenient and ecologically undesirable, since large amounts of silver will arrive in the processing liquid. Futhermore, the presence of the water soluble silver salt in the material causes fogging in the non-exposed areas.

It is an object of the present invention to provide a method for producing negative images of high quality from positive originals using the DTR process and which is convenient, ecologically acceptable and free from fogging in the non-image areas.

It is a second object of the present invention to provide an imaging element that can produce negative images of high quality starting from positive originals.

Further objects of the present invention will become clear from the description hereinafter.

3. Summary of the Invention

According to the invention an imaging element is provided comprising on a support, a light-sensitive silver halide emulsion layer comprising silver halide grains having an average volume of not more than 0.02 $\mu m^3$ and a layer containing non-light-sensitive water insoluble silver salt.

According to the present invention a method for producing a negative image is provided, comprising the following steps:

image-wise exposing an imaging element comprising on a support, a light-sensitive silver halide emulsion layer comprising silver halide grains having an average volume of not more than 0.02 $\mu m^3$ and a layer containing non-light-sensitive water insoluble silver salt, to produce a latent image in said layer of light-sensitive silver halide developing said latent image to produce physical development nuclei of silver dissolving the non-light-sensitive silver salts using a silver salt complexing agent and allowing the thus formed silver salt complexes to diffuse to the layer containing said image-wise formed physical development nuclei of silver to image-wise deposit and develop said silver salt complexes on said image-wise formed physical development nuclei of silver in the presence of (a) developing agent(s).

DETAILED DESCRIPTION OF THE INVENTION

Image-wise exposure through the front or the back of the imaging element of the invention produces a latent image in the light-sensitive silver halide emulsion layer. The thus obtained exposed imaging element is then processed in a diffusion transfer processing solution in the presence of a silver salt complexing agent and developing agents. During processing the latent image formed in the light-sensitive emulsion layer will be developed to form metallic silver particles which can subsequently serve as physical development nuclei for the non-light-sensitive silver salt particles dissolved by the silver salt complexing agent. The processing of the image-wise exposed imaging element is preferably carried out with a receiving sheet, containing physical development nuclei, in close contact with the imaging element. In the non-exposed areas the dissolved silver salt particles will then be deposited on the physical development nuclei present on the receiving sheet. After a few seconds the imaging element and receiving sheet are separated and a negative image is obtained in the imaging element while the receiving sheet contains a positive image of high quality and thus a negative and positive image of high quality are obtained in one step. If the positive image is not required, the receiving sheet can be used to recover the waste silver.

The above described method for obtaining a negative image of high quality starting from a positive original using the DTR process does not only accomplish the objects given above but is also excellent in transfer efficiency of the silver salts to the image-wise produced development nuclei of silver in the light-sensitive silver halide emulsion layer comprised on the imaging element of the invention. Therefore it has the advantage that saving of silver can be attained. The invention further offers the advantage that in case a transparent support is used exposure through the back is possible so that a right reading image is obtained without the need of special optics. Further the material of the present invention is especially suitable for use with laser scanners which are recently widely employed, since the time for such laser scanners to write the image can be greatly reduced because only the image parts of the originals need to be written. Since the image parts of an original mostly occupy only 10% of the total surface of the original, the time needed for the output of an image by a laser scanner therefore can be greatly reduced.

The light-sensitive silver halides used in this invention include silver chloride, silver bromide, silver iodide, silver chlorobromide, silver chloroiodide, silver iodobromide, silver chloroiodobromide and the like.

The light-sensitive silver halide emulsion of the imaging element used in accordance with the present invention may be prepared in a known way by precipitation reaction of halides, e.g. ammonium halide, potassium, sodium, lithium, cadmium and strontium halide with silver salts, e.g. silver nitrate, in a hydrophilic protective binder, preferably gelatin. In case developing agents are to be incorporated into the light-sensitive silver halide emulsion layer, they are added to the emulsion composition preferably after the chemical ripening stage following the washing of the emulsion. The silver halide grains used in the invention may have various crystal habits.

It was found that it was very important that the average volume of the light-sensitive silver halide grains does not exceed 0.02 $\mu m^3$ to obtain a negative image of high quality and high density.

The non-light-sensitive silver salt particles used in the invention are those which are insoluble in water, can be complexed by a complexing agent present in the diffusion transfer processing liquid and show substantially no light-sensitivity towards the light energy necessary to expose the light-sensitive silver halide emulsion layer and to form a latent image therein. Preferred silver salt particles used according to the invention are water insoluble silver salts e.g. a silver halide, bromate, molubdate, oxalate, chromate, iodate, isocyanate, thioisocyanate, cyanide, citrate phosphate, silver oxide etc.. The layer containing said non-light-sensitive water insoluble silver salt particles may be prepared using the precipitation reaction of the water soluble salt of the desired anion of the insoluble silver salt with a water soluble silver salt, e.g. silver nitrate, in the presence of a hydrophilic binder. Silver halide containing at least 70 mol % of chloride is preferred in the present invention for use as the non-light sensitive water insoluble silver salt. The silver halide is preferrably also doped with $Rh^{3+}$, $Ir^{4+}$, $Cd^{2+}$, $Zn^{2+}$ or $Pb^{2+}$ to reduce the light sensitivity of the silver halide.

The imaging element may contain in the light-sensitive silver halide emulsion layer and/or the layer containing the non-light-sensitive silver salt particles and/or in one or more layers in water-permeable relationship therewith any kind of compounds customarily employed for carrying out the DTR-process. Such layers may comprise e.g. one or more developing agents, coating aids, stabilizing agents or fog-inhibiting agents e.g. as described in the GB Patent specification 1007020 and in Research Disclosure No. 24236 of June 1984 pages 274 to 278, plasticizers, development-influencing agents e.g. polyoxyalkylene compounds, onium compounds, and thioether compounds as described in the U.S. Pat. Nos. 2,938,792; 3,021,215; 3,038,805; 3,046,134; 4,013,471; 4,072,523; 4,072,526; 4,292,400 and in the DE Patent specification 1124354, hardeners, spectral sensitizing agents, chemical sensitizing agents, toning agents as described in the published European patent applications 218752, 208346, 218753 and U.S. Pat. No. 4,683,189.

The binder of the light-sensitive silver halide emulsion layer and the layer containing the non-light-sensitive silver salt particles preferably is gelatin. But instead of gelatin, use can be made of one or more other natural and/or synthetic hydrophilic colloids e.g. albumin, casein, zein, polyvinyl alcohol, alginic acids or salts thereof, cellulose derivatives e.g. carboxymethyl cellulose, modified gelatin, etc. The weight ratio of hydrophilic colloid to silver in the light-sensitive emulsion layer can be from 20:1 to 1:1 but is preferrably between 10:1 and 1:1.

The support of the photosensitive element used in accordance with the present invention can be any of the support materials customarily employed in the art. They include paper coated on one or both sides with an Alpha-olefin polymer, e.g. polyethylene, glass or film, e.g. cellulose acetate film, polyvinyl acetal film, polystyrene film, polyethylene terephthalate film etc.. Polyethylene terephthalate film coated with a layer to improve the adhesion of the thereon deposited layers of the invention is preferred.

The support may further be coated with a backing layer containing pulverized particles, e.g. inorganic particles e.g. silica or organic particles e.g. particles of polymethyl methacrylate, having an average grain size from 0.1 to 10 μm to prevent the formation of an unwanted image arising from rubbing flaws and static electricity.

The emulsion-coated side of the imaging element can be provided with a top layer that contains water-permeable colloids. Such top layer will usually be free of gelatin. It must be of such nature that diffusion is not inhibited or restrained. Such layer may act e.g. as an anti-stress layer. Appropriate water-permeable binding agents for the layer coated on the emulsion coated side of the imaging element are e.g. methyl cellulose, the sodium salt of carboxymethyl cellulose, hydroxyethyl cellulose, hydroxyethyl starch, hydroxypropyl starch, sodium alginate, gum tragacanth, starch, polyvinyl alcohol, polyacrylic acid, polyacrylamide, polyvinyl pyrrolidone, polyoxyethylene, copoly(methylvinylether/maleic acid), etc. The thickness of this layer depends on the nature of the colloid used.

The total thickness of the layers comprised on the support of the imaging element is preferably less than 10 μm and most preferably less than 5 μm to obtain an image of high density and high resolution.

The receiving sheet used which may be used in accordance with the present invention to capture the undeveloped silver salt complexes comprises on a support a layer of physical development nuclei e.g. colloidal silver, heavy metal sulphides e.g. as silver sulphide, nickel sulphide, palladium sulphide, cobalt sulphide, zinc sulphide, silver nickel sulphide etc. The support of the receiving sheet may be any of the above mentioned supports for the imaging element. Polyethylenetherephthalate is preferably used as a support for the receiving sheet. The receiving sheet may further comprise a hydrophilic colloid layer in water-permeable relationship with the layer containing physical development nuclei.

The receiving sheet can thus be any of the customarily employed receiving sheets used to form high quality images according to the DTR-process or it can be a receptor material for development processing as described in EP-290077, EP-339696 and EP-221599.

The developing agent or mixture of developing agents can be incorporated into the alkaline processing solution and/or into the imaging element and/or in the receiving sheet. When incorporated into the imaging element the developing agent(s) can be present in the light-sensitive silver halide emulsion layer, the layer containing the non-light-sensitive silver salt particles or in a hydrophilic colloid layer in water-permeable relationship with one or both of these layers. When incorporated into the receiving sheet the developing agent(s) can be present in the layer containing the physical development nuclei or in a hydrophilic colloid layer in waterpermeable relationship therewith. In case the developing agent(s) are contained in the imaging element or the receiving sheet, the processing solution is merely an aqueous alkaline solution that initiates and activates the development.

Suitable developing agents are e.g. hydroquinone-type and 1-phenyl-3-pyrazolidone-type developing agents as well as p-monomethylaminophenol.

The processing solution usually contains alkaline substances e.g. tribasic phosphate, primary, secondary and tertiary alkanolamines or mixtures thereof as disclosed in the European patent application numbers 90201224.4, 89201253.5, 89201251.9, 89201254.3, U.S. Pat. No. 4,632,896 and DE-OS-3533449, preserving agents e.g. sodium sulphite, thickening agents e.g. hydroxyethylcellulose and carboxymethylcellulose, fog-inhibiting agents e.g. potassium bromide, silver halide solvents e.g. sodium or ammonium thiosulphate, sodium, potassium or ammonium thiocyanate, black-toning agents as described in the European patent applications 218752, 208346, 218753 and U.S. Pat. No. 4,683,189. The pH of the processing solution is preferably in the range of 9 to 14. With respect to alkaline substances for use in the processing solution, combinations of sodium carbonate with sodium hydroxide and/or 2-methylamino-ethanol were found to be advantageous because of improved buffering action and retarded exhaustion of the processing solution.

According to another embodiment of the present invention the processing solution does not contain any alkali substances. Instead the alkali substances are generated in situ by a reaction between a slightly water-soluble metal compound and a complexing agent. One of both compounds will be incorporated in the imaging element or receiving element while the other is contained in the processing solution or both compounds may be contained in separate layers on the imaging element and/or receiving element. The metal compound may be e.g. zinc hydroxide, cadmium hydroxide, aluminium hydroxide, titanium hydroxide, lead hydroxide as disclosed in U.S. Pat. No. 3,260,598 or EP-A-210659. Suitable complexing agents are e.g. sodium citrate, potassium citrate, sodium oxalate, sodium fluoride, potassium fluoride, sodium ferrocyanide, potassium ferrocyanide sodium tartrate, potassium tartrate, sodium sulfite, potassium sulfite etc. as disclosed in U.S. Pat. No. 3,260,598 or the complexing agents disclosed in EP-A-210659.

Processing of the imaging element of the invention is preferably carried out with the imaging element in contact with the above described receiving sheet so that contamination of the processing solution with silver ions is avoided.

The number of imaging elements that can be processed per liter of processing solution can also be greatly enhanced by wetting only the receiving sheet or imaging element and subsequently bringing them in contact with each other.

Instead of using one processing solution, two processing solutions may be used, of which only the second processing solution contains silver halide solvents.

The silver halide solvent may also be incorporated in one or more layers of the imaging element or may be incorporated in the receiving sheet.

The invention will now be illustrated with the following examples without being limited thereto. All parts are by weight unless otherwise specified.

EXAMPLE I

| Preparation of the non-light sensitive silver halide emulsion. | | |
|---|---|---|
| Solution A (35° C.): | water | 1500 ml |
| | AgNO$_3$ | 498 g |
| Solution B (35° C.): | water | 1360 ml |
| | NaCl | 184 g |
| | KBr | 10 g |
| Solution C (35° C.): | water | 2250 ml |
| | gelatin | 70 g |
| | KBr | 3.5 g |

Solution C was brought to 50° C. and 30 ml of a solution containing 3.9 % of Na$_3$RhCl$_6$ was added. After adjusting the pH to 3.5 solution A and B were added simultaniously to solution C in ten minutes. The resulting emulsion was precipitated by adding 85 ml of a solution containing 15% of polystyrene sulfonic acid. The precipitate was rinsed several times and redispersed by adding 180 g of gelatin per 2.2 kg of precipitate. The thus obtained emulsion was physically ripened for 2 hours. A non-light sensitive silver halide emulsion containing 96 mol % of silver chloride and 4mol % of silver bromide was thus obtained. The average grain size was 0.2 μm.

| Preparation of light-sensitive silver halide emulsion. | | |
|---|---|---|
| Solution A (30° C.): | AgNO$_3$ | 668 g |
| | water | 1000 ml |
| Solution B (30° C.): | water | 942 ml |
| | KBr | 327 g |
| | KI | 1.6 g |
| Solution C (30° C.): | water | 2615 ml |
| | gelatin | 77 g |
| | KBr | 40 g |
| | KI | 0.2 g |

Solution A and B were simultaniously added to solution C in 12 min. Physical ripening was carried out for 10 min., after which chemical ripening was conducted. As a result a light-sensitive silver halide emulsion containing 99,3 mol % AgBr and 0.7 mol % AgI was obtained. The average volume of the silver halide grains was 6.5*10$^{-5}$ μm$^3$.

PROCESS FOR PREPARING IMAGING ELEMENT

On a polyethylene terephthalate support (coated with a hydrophilic adhesion layer) the non-light sensitive emulsion was coated in an amount of silver halide equivalent to 2 g of silver nitrate per m$^2$. An intermediate layer of gelatin containing 20% by weight of 1-phenyl-4,4-dimethyl-3-pyrazolidinone and 37% by weight of hydroquinone was coated thereon in an amount of 0.7 g of gelatin per m$^2$. The light-sensitive emulsion was coated thereon at a ratio of 1 liter of coating solution per 45 m$^2$. The total dry thickness of the layers contained on the support was 4 μm.

The resulting imaging element was image-wise exposed and processed in contact with a receiving sheet containing AgNiS nuclei in a CP296b activator solution (commercially available from AGFA-GEVAERT N.V.) containing thiosulphate, N-methyl-ethanol amine and N-methyl-N,N-diethanol amine. The density of exposed and non-exposed areas was 3.7 and 0.1 respectively. A negative image of good quality is thus obtained.

EXAMPLE 2

An imaging element was prepared as in example I with the only difference that in the intermediate gelatin layer the developing agents were left out. The resulting imaging element was image-wise exposed and processed in contact with a receiving sheet containing AgNiS nuclei in a CP297b developing solution commercially available from AGFA-GEVAERT N.V. containing thiosulphate as the silver halide solvent, hydroquinone and 1-phenyl-4,4-dimethyl-3-pyrazolidone as developing agents and N-methylethanol amine and N-methyl-N,N-diethanol amine. The density of exposed and non-exposed areas was 3.6 and 0.04 respectively. A negative image of good quality is thus obtained.

EXAMPLE 3

An imaging element was prepared as in example 1. After image-wise exposure the imaging element was developed without contact with a receiving sheet in a CP296b activator solution commercially available from AGFA-GEVAERT N.V.. The density of exposed and non-exposed areas was 3.08 and 0.2 respectively. A negative image of good quality is thus obtained.

EXAMPLE 4

An imaging element was prepared as in example 2. After image-wise exposure the imaging element was developed without contact with a receiving sheet in a CP297b developer commercially available from AGFA-GEVAERT N.V.. The density of exposed and non-exposed areas was 2.8 and 0.2 respectively. A negative image of good quality is thus obtained.

EXAMPLE 5

An imaging element was prepared as in example 2. After image-wise exposure the imaging element was processed in a G700 developing solution commercially available from AGFA-GEVAERT N.V. containing no silver halide solvent and containing hydroquinone and N-methyl-pyrazolidone and was subsequently processed in contact with a receiving sheet, containing AgNiS nuclei, in a transfer developing solution CP297b commercially available from AGFA-GEVAERT N.V.. The density of exposed and non-exposed areas was 3.5 and 0.05 respectively. A negative image of good quality is thus obtained.

EXAMPLE 6

A light-sensitive silver halide emulsion was prepared as follows. The following 3 solutions were prepared.

| Solution A (55° C.): | AgNO$_3$ | 498 g |
|---|---|---|
| | water | 852 ml |
| Solution B (55° C.): | water | 1390 ml |
| | KBr | 356 g |
| | KI | 4.9 g |
| Solution C (60° C.): | water | 1100 ml |
| | gelatin | 70 g |
| | methionine | 43 g |

Solution A and B were simultaniously added to solution C in 3 min. Physical ripening was carried out for 25 min., after which chemical ripening was conducted. As a result a light-sensitive silver halide emulsion containing 99 mol % AgBr and 1 mol % AgI was obtained.

The average volume of the silver halide grains was 0.034 $\mu m^3$.

PROCESS FOR PREPARING IMAGING ELEMENT

On a polyethylene terephthalate support (coated with a hydrophilic adhesion layer) a non-light sensitive emulsion (prepared as described in example 1) was coated in an amount of silver halide equivalent to 2 g of silver nitrate per $m^2$. An intermediate layer of gelatin was coated thereon in an amount of 0.7 g gelatin per $m^2$. The light-sensitive silver halide emulsion was coated thereon at a ratio of 1 liter of coating solution per 45 $m^2$. The total dry thickness of the layers contained on the support was 4 $\mu m$.

The resulting imaging element was image-wise exposed and processed in contact with a receiving sheet containing AgNiS nuclei in a CP297b developer solution commercially available from AGFA-GEVAERT N.V.. The density of exposed and non-exposed areas was 0.73 and 0.03 respectively. This example shows the importance of the average volume of the silver halide grains of the light-sensitive silver halide emulsion layer to obtain a negative image of good quality. If the average volume of the grains is to large, the density in the exposed areas is low as shown in this example.

We claim:

1. A method for producing a negative image, comprising the following steps:
   image-wise exposing an imaging element comprising on a support, a light-sensitive silver halide emulsion layer comprising silver halide grains having an average volume of not more than 0.02 $\mu m^3$ and a layer containing non-light-sensitive water insoluble -silver salt, to produce a latent image in said layer of light-sensitive silver halide
   developing said latent image to produce physical development nuclei of silver
   dissolving the non-light-sensitive silver salts using a silver salt complexing agent and
   allowing the thus formed silver salt complexes to diffuse to the layer containing said image-wise formed physical development nuclei of silver to image-wise deposit and develop said silver salt complexes on said image-wise formed physical development nuclei of silver in the presence of (a) developing agent(s).

2. A method according to claim I wherein said image-wise exposed imaging element is processed with a receiving material, comprising on a support a layer of physical development nuclei, in contact with said imaging element.

3. A method according to any of the above claims wherein the developing agent(s) are contained in said imaging element.

4. A method according to claim 1 wherein said silver salt complexing agents are contained in said imaging element.

5. An aqueous developable imaging element comprising on a support, a light-sensitive silver halide emulsion layer comprising silver halide grains having an average volume of not more than 0.02 $\mu m^3$, a layer containing non-light-sensitive water insoluble silver salt, and at least one silver salt complexing agent in one or more of said layers on said support.

6. An aqueous developable imaging element comprising on a support, a light-sensitive silver halide emulsion layer comprising silver halide grains having an average volume of not more than 0.02 $\mu m^3$, a layer containing non-light-sensitive water insoluble silver salt wherein said non-light sensitive and water insoluble silver salt is silver chloride.

* * * * *